United States Patent

Choquette et al.

[15] 3,652,180
[45] Mar. 28, 1972

[54] CENTRIFUGAL PUMP AND SEAL MEANS THEREFORE

[72] Inventors: Henry T. Choquette; Lawrence T. Gobble, both of Denver, Colo.; James B. Studebaker, Mexico City, Mexico; John D. Whittier, Lakewood, Colo.

[73] Assignee: A. R. Wilfley and Sons, Inc., Denver, Colo.

[22] Filed: July 13, 1970

[21] Appl. No.: 54,458

[52] U.S. Cl. .................................. 415/113, 415/34, 415/109
[51] Int. Cl. .......................................................... F01d 11/00
[58] Field of Search ..................................... 415/34, 109, 113

[56] References Cited

UNITED STATES PATENTS

| 3,162,135 | 12/1964 | Nichols et al. | 415/109 |
| 2,571,802 | 10/1951 | Wilfley et al. | 415/34 |
| 3,115,097 | 12/1963 | Zagar et al. | 415/34 |
| 3,402,671 | 9/1968 | Wilfley et al. | 415/109 |

Primary Examiner—C. J. Husar
Attorney—Shoemaker and Mattare

[57] ABSTRACT

The centrifugal pump has a mechanical seal means disposed between its casing and the shaft of the pump. The seal means has a first position in sealing engagement with a stationary seal ring housing under the influence of a spring when the pump is at rest, and a second position in unsealed relation with respect to the stationary seal housing when the pump reaches a predetermined operating speed. Expeller means are provided for effecting a hydraulic seal during operation of the pump and labyrinth means are provided between a rotary seal housing and the stationary seal housing for effecting a fail safe seal in the event there is severe mechanical seal failure. The mechanical seal means seals with pressure and is thus aided by the static case pressure.

12 Claims, 5 Drawing Figures

Fig_1

INVENTORS.
HENRY T. CHOQUETTE
LAWRENCE T. GOBBLE
JAMES B. STUDEBAKER
JOHN D. WHITTIER
BY
Shoemaker and Mattare
ATTORNEYS INVENTORS.
HENRY T. CHOQUETTE
LAWRENCE T. GOBBLE
JAMES B. STUDEBAKER
JOHN D. WHITTIER BY Shoemaker and Mattare

ATTORNEYS

INVENTORS.
HENRY T. CHOQUETTE
LAWRENCE T. GOBBLE
JAMES B. STUDEBAKER
JOHN D. WHITTIER
BY
Shoemaker and Mattare
ATTORNEYS

CENTRIFUGAL PUMP AND SEAL MEANS THEREFORE

BACKGROUND OF THE INVENTION

The present invention relates to a centrifugal pump including means for producing a mechanical seal when the pump is at rest and a hydraulic seal when the pump is operating at a predetermined speed.

U.S. Pat. No. 2,571,802 discloses an earlier development wherein the entire shaft and impeller of the centrifugal pump is shifted in order to disengage mechanical sealing surfaces. This arrangement is not entirely satisfactory because of the increased stress and wear imposed on the pump components, such as the shaft bearings, and because of the heavier springs and the like required to move the shaft and impeller.

More recent developments are illustrated, for example, in U.S. Pat. Nos. 3,137,237 and 3,402,671 wherein the shaft is axially fixed with respect to the pump and a nonrotating sealing member is shifted axially when the pump is operating to disengage the mechanical seal and to allow the hydraulic seal to perform the sealing function.

U.S. Pat. No. 3,137,237 employs a bellows-like sealing means which may be subject to failure upon repeated cycling thereof, and U.S. Pat. No. 3,402,671 employs a more complex sealing means wherein a plurality of elements are interconnected through spring means to operate the sealing element.

SUMMARY OF THE INVENTION

In the arrangement of the present invention, the shaft and pump impeller are not shifted axially but the seal itself is shifted. The movable sealing portion of the sealing means is supported by a rotary seal housing which is axially reciprocable within the pump housing and which rotates with the shaft and pump impeller. This rotary seal housing includes supplemental sealing means for maintaining a seal between the rotary seal housing and pump shaft during reciprocation of the rotary seal housing and seal during pump start-up and shutdown as well as during pump operation. The secondary or supplemental seal is subjected to movement and wear only when the pump is starting up or shutting down since the seal rotates with the pump shaft and there is no relative rotation therebetween. The movable sealing portion, on the other hand, is subjected to movement and wear only for a very short time during pump start-up and shutdown. The relative rotation between the stationary seal housing and rotary or movable seal lasts only for a very short time as the pump very quickly reaches operating speed. Wear is thus kept at a minimum.

Sealing with the pump at rest is accomplished in the present invention by means of a seal return spring which is operable to axially shift the rotary seal housing in a first direction with the movable sealing means in sealing engagement with a sealing portion or shoulder on the stationary seal housing. The seal return spring is sized to hold the seal closed until the pump has very nearly reached operating speed. Speed responsive flyweight or actuator weight means is provided for overcoming the force of the spring means at a predetermined speed of rotation of the pump to effect disengagement of the sealing portions of the sealing means. While the pump is operating, the movable sealing portions remain disengaged under the influence of the speed responsive means and an effective hydraulic seal is accomplished by the provision of expeller means comprising a primary expeller case integrally on the rear face of the impeller and a secondary expeller isolated in a chamber between the impeller and mechanical seal.

A basic object of the invention is to form a liquid tight seal when the pump is not operating and to remove all rubbing contact between seal components while the pump is operating. This eliminates the troublesome problem of operation in a dirty liquid or slurry environment that generally causes excessive wear and mechanical erosion, or degradation from chemical attact (corrosion). In this design the movable parts move a short distance one-eighth inch opening a gap between moving and stationary parts. Toward this objective, the sealing means closes or seals with pressure, and in addition to the closing force provided by the return spring, the sealing member is held into closed position by the internal pressure that must be sealed, whether created by inlet suction pressure, developed pump pressure or a combination of the two. This sealing force prevents leakage regardless of the magnitude of the case pressure. With no additional augmenting pressure forces, the closing spring provides sufficient force to keep the sealing mechanism closed and leak free while the pump is not running and pressures are minimal.

The above characteristic that aids sealing when not turning also aids to prevent leakage, dripping or splashout while the pump is starting up, shutting down or while running with excessive system and case pressures. As the pump starts turning, the auxiliary expellers start functioning reducing fluid in the seal area by essentially pumping fluid from the seal area or actuator cavity back into the case. Flyweight force is not sufficient to disengage the movable seal from the sealing shoulder on the stationary seal housing until effective expeller action has been established and the pressure which the valve is sealing against has been lowered or removed.

Annular clearances between the rotating seal ring housing and the stationary seal housing are so sized to provide a labyrinth seal path that in the event of gross seal mechanism failure or leakage flow from any reason, a large pressure difference is created across the movable seal which urges the movable parts immediately into the closed position, overcoming flyweight forces if present. This provides a sort of fail-safe characteristic.

An actuator plate is attached to the rotating seal ring housing and forms a further labyrinth and also forms a splash plate that directs any possible leakage flow away from the pump shaft bearing and outward into the stationary seal housing drain or overflow passage by a centrifugal slinging action.

The simplicity of arrangement provides additional benefits. Normally only two metallic components ever contact the solution being pumped and sealed. This means that cost can be reduced by reducing the number of parts requiring fabrication of corrosion resistant or other exotic materials. The more highly stressed parts—the spring, actuator weights or flyweights, flyweight pivot pins and the actuator spider—may be fabricated from materials more properly suited to their function. The arrangement of parts also precludes the possibility of the pumped fluid from coming into contact with the pump shaft. Close dimensional control and flatness of sealing surfaces is not critical for the proper operation of the sealing mechanism, and the components are essentially self-aligning and free-floating so that they assume the proper position to perform their required function.

DESCRIPTION OF THE PREFERRED EMBODIMENT

Figure 1:
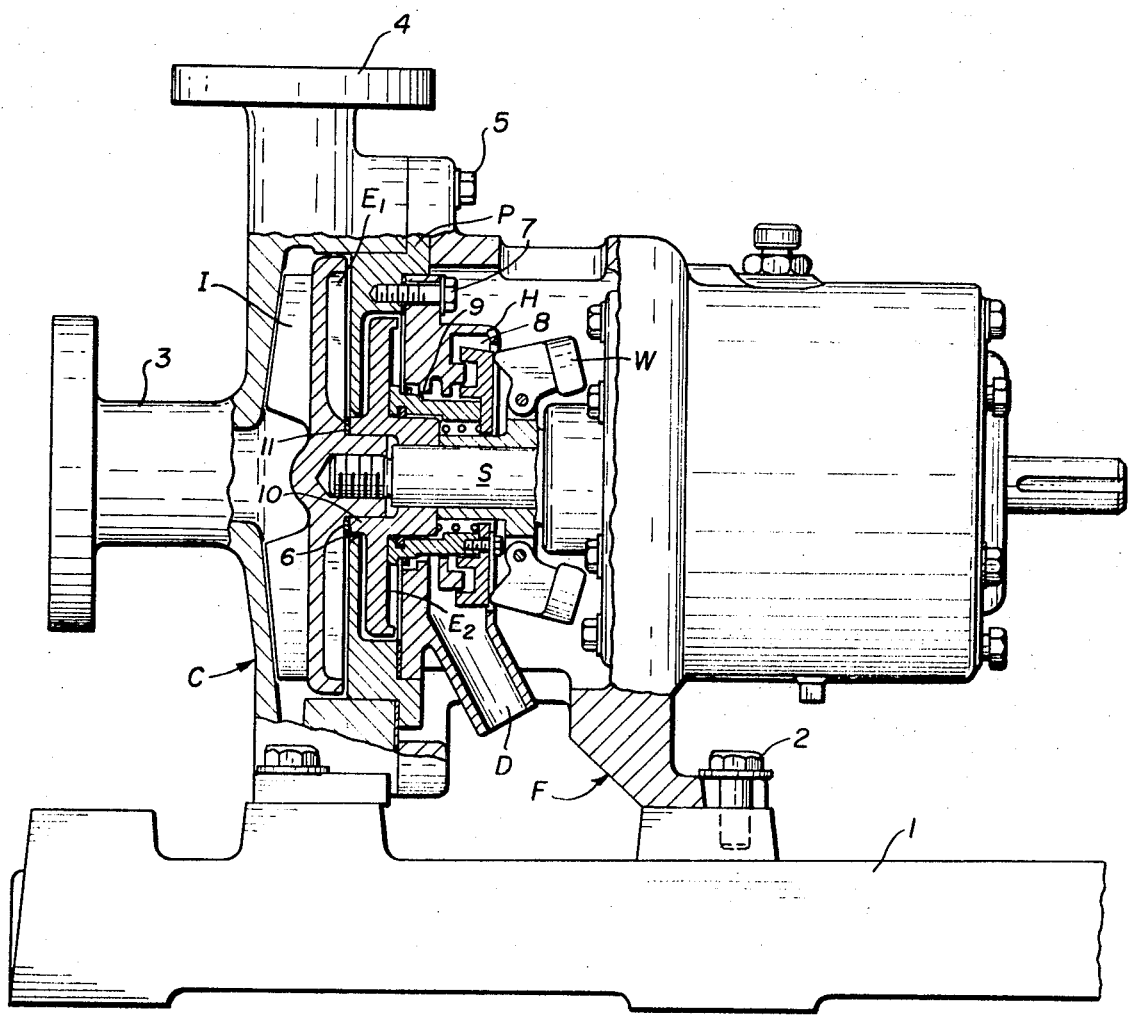
FIG. 1 is a longitudinal view in elevation partly in section of a centrifugal pump according to the present invention.

Referring now to the drawings wherein like reference characters designate corresponding parts throughout the several views, the centrifugal pump is depicted in FIG. 1 and includes a base means 1 to which is secured by means of cap screws or the like 2 a pump case C and a frame F. The case C includes an inlet 3 and an outlet 4 and is closed at its back by means of a case plate P clamped between the frame F and the case C by means of case cap screws or the like 5 and which has a central opening 6 therethrough.

A stationary seal housing H is secured to the back of the case plate P over the opening 6 by means of case plate cap screws or the like 7 and includes an actuator cavity 8 therein and a central opening 9 therethrough in axial alignment with opening 6 in the case plate P. A housing drain D is provided at the bottom of the stationary seal housing H in communication with the actuator cavity 8 for draining fluid therefrom. A shaft S extends axially through the aligned openings 6 and 9 formed centrally in the case plate and stationary seal housing, respectively, and has suitably affixed thereto as by threads or the like at its forward end within the pump casing an impeller I for pumping material from the case inlet 3 through the case outlet 4 and an integrally cast primary expeller $E_1$ for removing material from the case which is not pumped by the impeller. An isolated or secondary expeller $E_2$ is suitably fixed to the shaft rearwardly of the case plate P between the case plate and stationary seal housing H and has a hub portion 10 closely received through opening 6 in the case plate. Isolated expeller $E_2$ reduces the pressure in the seal area to below atmospheric pressure to effect a hydraulic seal when the pump is operating. An impeller gasket 11 is disposed between the hub of the impeller I and the hub of the isolated expeller $E_2$ for effecting a seal therebetween as seen most clearly in FIGS. 2 and 3.

Figure 2:
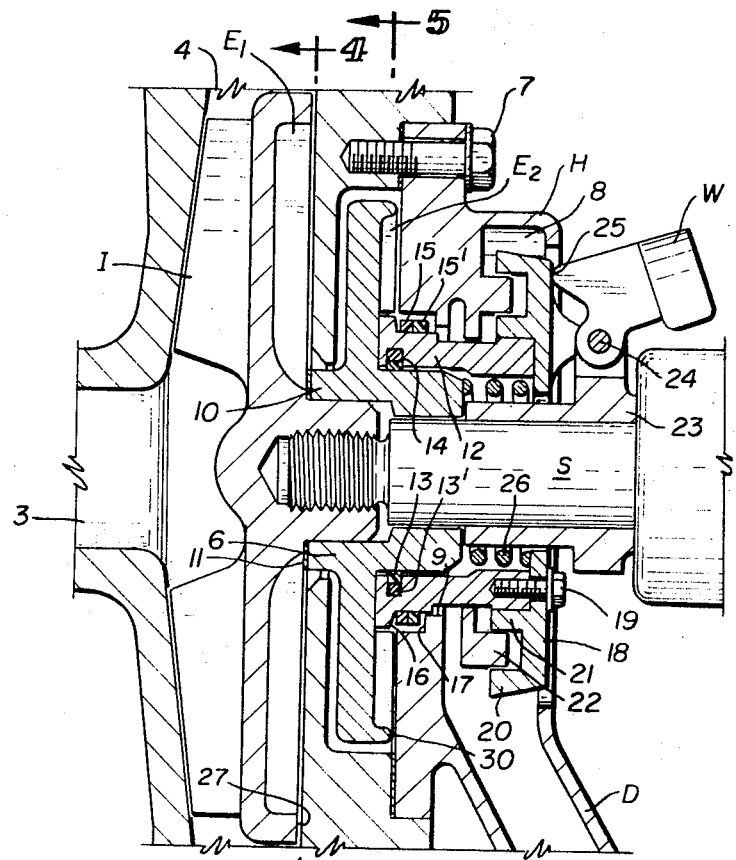
FIG. 2 is an enlarged sectional view of a portion of the structure illustrated in FIG. 1 showing the movable seal means disengaged with the pump at operating speed.
Figure 3:
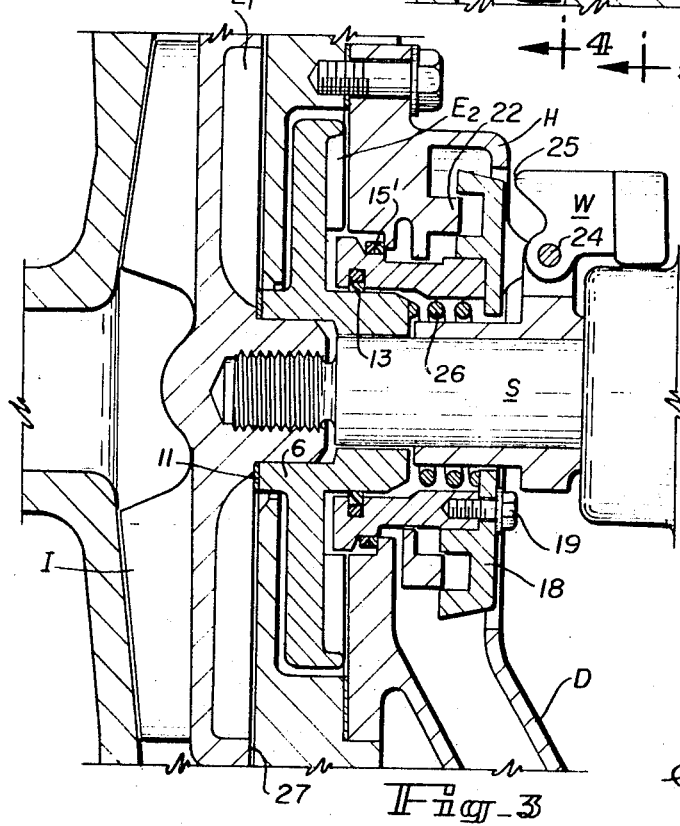
FIG. 3 is a view similar to FIG. 2 showing the movable sealing means engaged with the pump at rest.

The mechanical seal means of the present invention is also seen most clearly in FIGS. 2 and 3 and comprises a cylindrical rotary seal housing 12 having one end thereof disposed in axially slidable relation over the hub 10 of the isolated expeller $E_2$ and the other end extending beyond said hub into actuator cavity 8 in spaced surrounding relationship to the shaft S. A secondary or stationary seal comprised of a Teflon ring 13 is disposed in a groove 14 in the inner marginal end portion of the rotary seal housing 12 and slidably and sealingly cooperates with the isolated expeller hub 10 to seal the rotary seal housing to the hub. A primary or rotary seal comprising a pair of side-by-side square Teflon rings 15, 15' is shrunk onto the outside diameter of the rotary seal housing 12 adjacent to a shoulder 16 at the forward end of the rotary seal housing for pressing the seal rings into cooperative engagement with a stationary sealing shoulder or ledge 17 in the stationary seal housing adjacent the opening 9. The aforedescribed arrangement of the seal means provides a self-cleaning action at start up and shut down that removes and excludes small particles or contamination that would damage or wear the seal faces excessively.

A seal actuator plate or body 18 is fixed by means of cap screws or the like 19 to the rearmost end of rotary seal housing 12 within actuator cavity 8. The actuator plate includes a pair of radially spaced, forwardly extending annular flanges 20, 21, which receive therebetween in closely spaced relationship a rearwardly extending annular flange 22 from stationary seal housing H for effecting a labyrinth seal therebetween.

Fixed to the shaft rearwardly of the isolated expeller hub is an actuator spider 23 which has pivotally attached thereto by means of actuator weight hinge pins 24 a plurality of actuator weights W disposed rearwardly of the stationary seal housing H and which include a forwardly projecting rounded portion 25 for engaging the actuator plate 18 when the pump is operating at a predetermined speed. The spider 23 is of lesser outer diameter than the hub 10 of expeller $E_2$ and an annular space is defined between the spider and the end of the rotary seal housing 12 which extends thereover. A coil compression spring 26 is disposed in this annular space concentrically over the forward portion of the spider and is in abutting engagement at its opposite ends with the rear most end of the hub 10 of expeller $E_2$ and with an annular portion of actuator plate 18 which extends radially inwardly of the rotary seal housing 12 to urge the rotary seal 15, 15' into sealing engagement with the sealing shoulder 17. Upon the pump reaching a predetermined operating speed, the actuator weight W overcomes the biasing force of the spring 26 and urges the actuator plate and rotary seal housing forwardly to disengage the rotary seal ring 15, 15' from the sealing shoulder 17 as shown in FIG. 2. When the pump speed drops below a predetermined value, the spring 26 overcomes the force of actuator weights W and urges the seal ring 15 into sealing engagement with sealing shoulder 17, as seen in FIG. 3.

The clearances between the rotary seal housing and actuator plate and the actuator spider and stationary seal housing are such that the rotary seal housing and actuator plate are free floating for proper alignment of the seal rings.

Figure 4:
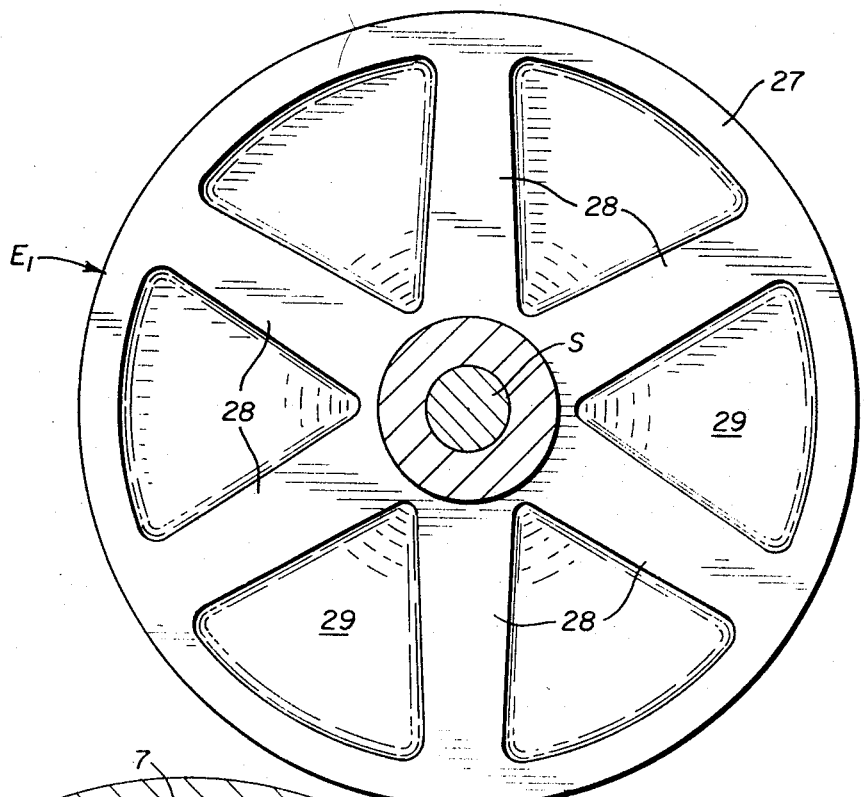
FIG. 4 is a plan view of the primary expeller taken along line 4—4 in FIG. 2 and looking in the direction of the arrows.

The configuration of the primary expeller $E_1$ is depicted most clearly in FIGS. 2 and 4 and comprises an annular integrally formed rearwardly extending flange or wall 27 on the periphery of the impeller I and a plurality of radially extending vanes 28 integrally formed on the rear face of the impeller and extending between the hub of the impeller and the rearwardly extending flange 27 to define expeller ports 29 therebetween. The expeller ports 29 function to evacuate material from adjacent the hub of the impeller and opening 6 and to aid the impeller in pumping material through the outlet 4. The rearwardly extending flange 27 causes a high pressure area to be generated at the peripheral portion of the expeller thus tending to preclude the flow of material from the front or pumping ports of the impeller around the periphery thereof to the area rearwardly of the impeller.

Figure 5:
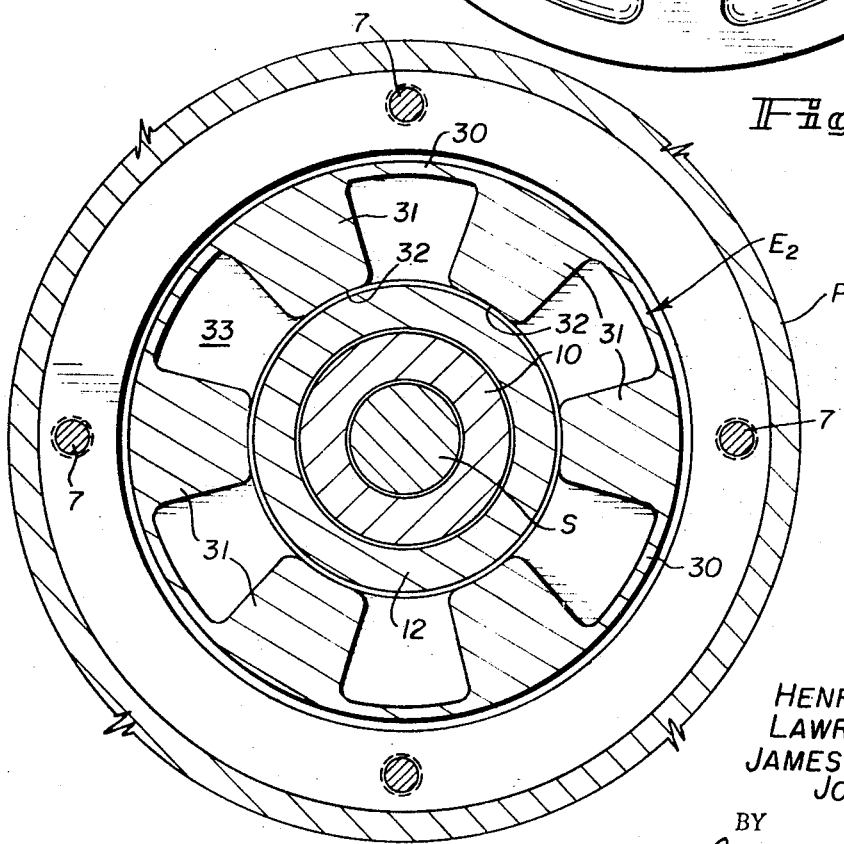
FIG. 5 is a plan view of the secondary expeller taken along line 5—5 in FIG. 2 and looking in the direction of the arrows.

The secondary or isolated expeller $E_2$ is depicted most clearly in FIGS. 2 and 5 and comprises a substantially disc-shaped member with an annular integrally formed rearwardly extending flange or wall 30 on the rear peripheral marginal portion thereof. A plurality of circumferentially spaced integral expeller vanes 31 extend radially inwardly from the rearwardly extending flange 30 to a position spaced closely adjacent to and radially outwardly of the rotary seal housing 12, which projects at its forward end over the hub 10 of isolated expeller $E_2$ concentrically between the hub 10 and the radially inner ends 32 of expeller vanes 31. The expeller vanes define a plurality of expeller ports 33 therebetween which evacuate material from adjacent the hub of the expeller and the seal cavity and in conjunction with the rearwardly extending flange 30 establishes a high pressure area at the peripheral portion of the expeller $E_2$ to preclude flow of material back from the impeller past the isolated or secondary expeller $E_2$ into the seal cavity. The primary and secondary expellers $E_1$ and $E_2$ thus effectuate a hydraulic seal while the pump is operating and prevent the loss of material along the pump shaft when the mechanical seal 15, 17 is inoperative.

With the arrangement of parts and the specific sealing means described hereinabove, the clearances between moving parts can be maintained much closer and the hydraulic efficiency of the pump significantly improved over prior art arrangements. It will be noted that in the specific embodiment described, the isolated expeller $E_2$ has a smaller diameter than does the primary expeller $E_1$. Actually, the specific relationship of the diameters of the primary and secondary expellers, $E_1$ and $E_2$, is selected depending upon the particular hydraulic characteristics desired of the pump. The secondary expeller should be sized such as to achieve an effective hydraulic seal against the developed case pressures when the pump is operating.

We claim:

1. A centrifugal pump and seal means therefor comprising:
   a pump casing having an inlet and outlet, a rotatable pump drive shaft in said casing, an impeller in said casing secured to the forward end of said shaft for rotation therewith, sealing means for preventing liquid flow between said casing and said shaft, said sealing means including a first sealing portion axially fixed with respect to said pump, said sealing means including a second sealing portion axially movable with respect to said pump and sealingly engageable with said first seal portion, and operating means for moving said second sealing portion with respect to said first sealing portion, said operating means including spring means for moving said second sealing portion into sealing engagement with said first sealing portion, and speed responsive actuator means secured to said shaft and operative at a predetermined speed of rotation of said shaft to overcome the force of said spring means and move said second sealing portion out of sealing engagement with said first sealing portion.

2. A centrifugal pump and seal means as in claim 1, wherein said seal means includes a stationary seal housing secured to the back of said casing and having a central opening through which the pump shaft extends, and said first sealing portion is on said stationary seal housing adjacent said central opening.

3. A centrifugal pump and seal means as in claim 2, wherein said second sealing portion includes a cylindrical rotary seal housing received through said central opening and having a resilient seal ring on the forward end thereof, said seal ring cooperating with said first sealing portion.

4. A centrifugal pump and seal means as in claim 3, wherein an expeller means having a rearwardly extending hub is secured on said shaft and said rotary seal housing is slidably received at its forward end over the hub of said expeller and supplemental sealing means is provided between said rotary seal housing and said hub. transversely 5. A centrifugal pump and seal means as in claim 4, wherein an actuator spider of lesser outside diameter than said expeller hub is secured on said shaft rearwardly of said expeller and extends axially along said shaft rearwardly beyond said stationary seal housing and has pivotally secured thereto a plurality of actuator weights.

6. A centrifugal pump and seal as in claim 5 wherein the stationary seal housing has an actuator cavity in the rear portion thereof and an actuator plate is transversely secured to the rear end of said rotary seal housing in said cavity, said actuator plate having a central opening therein and through which the actuator spider extends, said actuator weights cooperating with said actuator plate to move the plate and the rotary seal housing and associated seal ring out of operative engagement with said first sealing portion.

7. A centrifugal pump and seal as in claim 6, wherein an annular space is defined between the rotary seal housing and the actuator spider and said spring means comprises a coil compression spring in said annular space surrounding said actuator spider with one end thereof in abutting relationship with said expeller hub and the other end in abutting relationship with said actuator plate to urge the actuator plate and rotary seal housing and associated seal ring into operative engagement with said first sealing portion.

8. A centrifugal pump as in claim 7, wherein labyrinth means is between said stationary seal housing and said rotary seal housing to effect a labyrinth seal therebetween.

9. A centrifugal pump and seal as in claim 8 wherein labyrinth means is between said stationary seal housing and said actuator plate to effect a labyrinth seal therebetween.

10. A centrifugal pump and seal as in claim 9 wherein drain means is on said stationary seal housing in communication with said actuator cavity to drain fluid therefrom which passes said seal.

11. A centrifugal pump as in claim 3, wherein expeller means are secured to said shaft for rotation therewith, in said casing, said expeller means comprising a primary expeller integrally formed on the rear face of the pump impeller, and an isolated secondary expeller secured on said shaft rearwardly of the primary expeller and substantially isolated therefrom by annular wall means interposed between the primary expeller and the secondary expeller.

12. A centrifugal pump as in claim 11, wherein said impeller includes a hub, said primary expeller comprises an annular rearwardly extending flange on the periphery of said impeller and a plurality of expeller vanes extending radially between said rearwardly extending flange and said impeller hub, said secondary expeller is generally disc-shaped and includes a first hub portion snugly received over the hub of said impeller and a second hub portion secured to said shaft, an annular rearwardly extending flange on the periphery of said secondary expeller, and a plurality of expeller vanes extending radially inwardly from said rearwardly extending flange and terminating at inner ends short of said second hub portion, said rotary seal housing received over said second hub portion concentrically between said second hub portion and the inner ends of said radially extending secondary expeller vanes.

* * * * *